United States Patent [19]

Gullman et al.

[11] Patent Number: 5,280,527

[45] Date of Patent: Jan. 18, 1994

[54] BIOMETRIC TOKEN FOR AUTHORIZING ACCESS TO A HOST SYSTEM

[75] Inventors: Lawrence S. Gullman, Lahonda; Eric Edwards, Menlo Park, both of Calif.; Norman Fast, Newton, Mass.

[73] Assignee: Kamahira Safe Co., Inc., Hiroshima, Japan

[21] Appl. No.: 868,167

[22] Filed: Apr. 14, 1992

[51] Int. Cl.5 ............................................. H04K 1/00
[52] U.S. Cl. ................................................ 380/23; 380/25
[58] Field of Search ...................................... 380/23, 25

[56] References Cited

U.S. PATENT DOCUMENTS

| | | |
|---|---|---|
| 4,405,829 | 9/1983 | Rivest et al. |
| 4,609,777 | 9/1986 | Cargile |
| 4,720,860 | 1/1988 | Weiss |
| 4,819,267 | 4/1989 | Cargile et al. |
| 4,856,062 | 8/1989 | Weiss |
| 4,885,778 | 12/1989 | Weiss |
| 4,926,480 | 5/1990 | Chaum ............................ 380/23 |
| 4,941,173 | 10/1990 | Boule et al. ..................... 380/25 |
| 4,972,476 | 11/1990 | Nathans .......................... 380/25 |
| 4,993,068 | 2/1991 | Piosenka et al. ................ 380/23 |
| 4,998,279 | 3/1991 | Weiss |
| 5,020,105 | 5/1991 | Rosen et al. ..................... 380/23 |
| 5,056,141 | 10/1991 | Dyke ............................... 380/25 |
| 5,065,429 | 11/1991 | Lang ............................... 380/25 |
| 5,131,038 | 7/1992 | Puhl et al. ....................... 380/23 |

Primary Examiner—David C. Cain
Attorney, Agent, or Firm—J. E. Brunton

[57] ABSTRACT

A security apparatus receives a biometric input from a user, which then is compared to a template to determine a correlation factor. The correlation factor, a fixed code and either a time-varying code or a challenge code then are combined to generate a token. The token is displayed to the user, who then enters the token at an access device. The access device is coupled to a secure host system. The access device forwards the token to the host, which processes the token to determine whether access is permitted. In one embodiment, the host is an electronic banking system. If access to such system is permitted the user is allowed to perform an electronic funds transfer. The security apparatus in one embodiment is an integrated circuit card. Each apparatus includes a sensor for detecting the holder's biometric information (i.e., voice, signature, fingerprint), along with a processor and display. The processor generates the token which then is displayed to the holder.

10 Claims, 2 Drawing Sheets

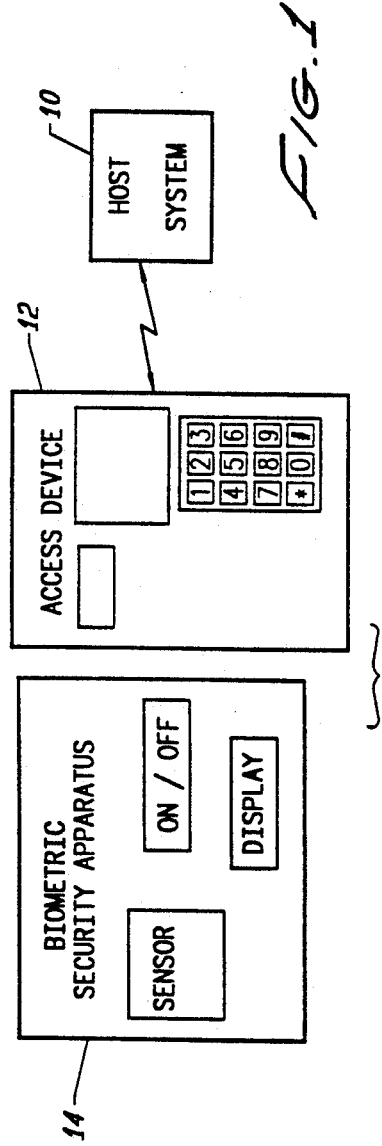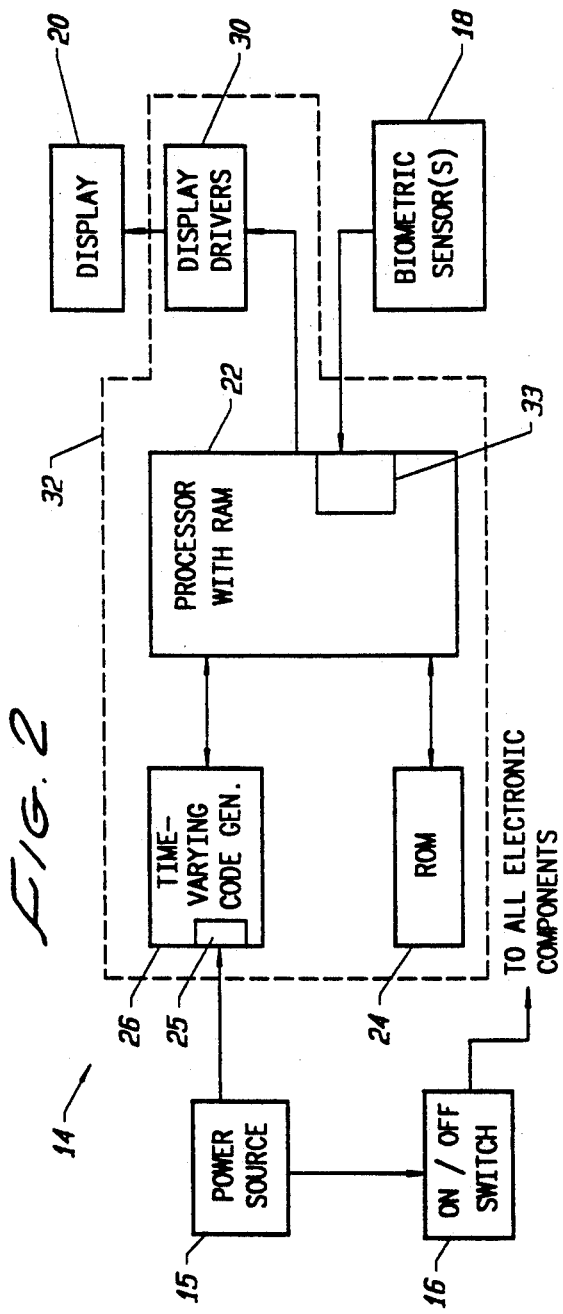

BIOMETRIC TOKEN FOR AUTHORIZING ACCESS TO A HOST SYSTEM

BACKGROUND OF THE INVENTION

This invention relates to identification and security systems which protect access to electronic host systems, such as computers and the like. More particularly this invention relates to an apparatus for accepting a biometric measurement which is then used as a seed for deriving a security token. Such token is communicated to a host system for determining whether access to such host is to be authorized.

With the increase in private information potentially accessible to anyone using electronic communication systems, there is a corresponding increase in the need to provide security measures for safeguarding access to such information. Automatic teller machines for banking transactions allow anyone in possession of a select bank card and knowledge of a corresponding personal identification number (PIN) to access a corresponding bank account to withdraw or transfer money. Persons can even pay their bills or shop by computer. The increasing opportunity to implement electronic transactions is accompanied by an increasing danger of electronic theft. Thus, there is a need for increasingly effective security mechanisms.

Common security mechanisms include use of a personal identification number (PIN) and use of a security token. A PIN is used to identify an individual and authorize access to a host system (e.g., banking transaction system). A security token is a non-predictable code derived from a private key, e.g. a unique fixed value, and a public key, e.g. a time varying value. For example, a password (fixed key) is encoded based upon time-variant information. Such token then is forwarded to the host which decodes the token back to a password. The token thus provides security during transmission to prevent the unique fixed value from being identified. Even if a perpetrator intercepts a token during transmission, reapplication of the intercepted token will not enable access to the host system because the time-varying "public key" will have changed. Thus, a PIN provides user identification, while a token provides transmission security.

A problem with personal identification numbers and tokens is that the legitimate user must remember the number or password. For users having many numbers or passwords, the task of remembering can be burdensome. Further, some cards, such as long distance calling cards, even print the private access code directly on the card. Thus, if the card is lost or stolen, the finder may access the system at the legitimate user's expense. Accordingly, there is a need for an improved security mechanism enabling convenient use, while providing security safeguards.

One known use of biometric information with secret codes and tokens is described in U.S. Pat. No. 4,998,279 issued Mar. 5, 1991 for METHOD AND APPARATUS FOR PERSONAL VERIFICATION UTILIZING NONPREDICTABLE CODES AND BIO-CHARACTERISTICS ("Weiss"), the full disclosure of which is hereby incorporated herein by reference. According to such disclosure, a credit card sized computer generates a token from a secret "fixed" code (i.e., PIN) and a public "time-varying" code (i.e., time of day). Such token is displayed on the card so the user can enter the token to an access machine. The entry is done so as to combine the token with biocharacteristic information. For example, the token may be entered by having the user write the token numbers on a pressure-sensing pad or speak the token numbers into a telephone. The access verification system then compares the token to see if valid and compares the bio-input (e.g., voice or signature) to see if from the authorized user. Thus, the biocharacteristic information is used to identify an authorized user.

Another common security mechanism that uses a personal identification number PIN and security token is a challenge/response token. It produces a dynamic security password not from a time varying value generated internally, but from a challenge number provided by the host system and manually input to the token. One such example is the SafeWord ® AccessCard produced by Enigma Logic, Inc., of Concord, Calif.

SUMMARY OF THE INVENTION

According to the invention, biometric information is input to a biometric security device which generates in response a security token. The biometric information is used as part of the "seed" for generating the token. Such token is then communicated to a host system or access device to determine whether access to the host is permitted.

According to one aspect of the invention, the biometric security mechanism stores a template of user biometric information (i.e., signature, finger-print, voice-print). To access the host system, the user enters the corresponding biometric information to the security mechanism. The mechanism verifies the input against the template, then generates and displays a token based on the verification. The user then communicates the token to the host system which decodes the token and determines whether access is authorized. More specifically, the token is derived from the results of the biometric comparison, plus a time-varying value.

According to another embodiment of the invention, the token is derived from the results of the above described biometric comparison, plus a user input challenge code from the host, rather than a time varying value. In a further embodiment, the biometric information is collected from the operation of the user of inputting the challenge to the device, either using a keypad, writing tablet or by voice.

In an exemplary embodiment of the invention, the biometric security mechanism is an integrated circuit card including a processing unit, memory and a biometric sensor. The memory stores a template of the authorized user's biometric information, along with a verification algorithm. Upon entry of the cardholder's biometric information, the processor executes the verification algorithm. The verification algorithm uses the template data, the biometric input, a fixed code (i.e., PIN, embedded serial number, account number) and time-varying self-generated information to derive a token output. The token output is displayed on the card where the cardholder can view the token and manually enter the token to an access device coupled to the host system. In an alternative embodiment, the token output is transmitted directly to the host system through a direct data communication line, eliminating the need for manual entry by the user.

A host system may be any electronic system requiring or providing security access. For example, the host system may be an automatic teller machine, a bank's computer system or even an electronic gate for accessing a secured area.

The invention will be better understood by reference to the following detailed description taken in conjunction with the accompanying drawings.

BRIEF DESCRIPTION OF THE DRAWINGS

FIG. 1 is a block diagram of a security system including a biometric security apparatus for generating a token according to an embodiment of this invention.

FIG. 2 is an electronics block diagram of the biometric security apparatus.

DESCRIPTION OF SPECIFIC EMBODIMENTS

Overview

Figure 3:
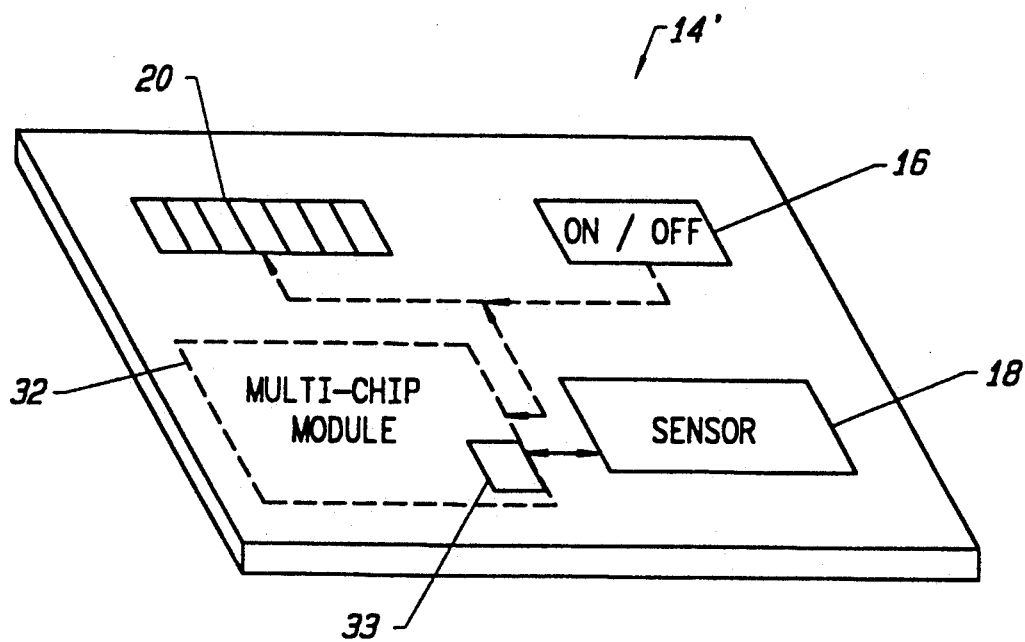
FIG. 3 is an integrated circuit card embodiment of the biometric security apparatus of FIG. 1.

Security safeguards for accessing a host system 10 are provided by an access device 12 and a biometric security apparatus 14. Typically, the host system 10 is a computer system, on-line bank system or even a secured area. The host system 10 (or host area) is presumed to contain confidential or valuable information which must be secured against unauthorized access. To safeguard access to such information, access is limited by an access device 12. Such access device 12 communicates with the host system to verify authorized personnel and transfer information. The access device may be a terminal in communication with a host computer, an automated teller machine in communication with a banking network having a host database management system, a telephone linked to a computer system or even an electronic lock restricting access to a secured area. The biometric security mechanism 14 adds another level of security to the access process.

According to the invention, the biometric security mechanism 14 generates a security token which the user inputs to the access device 12 Such security token is formed from biometric information, a fixed code and, in one embodiment, a time-varying code or, in a second embodiment, a host-generated challenge code. The biometric information may be a fingerprint, voiceprint or writing sample. The security apparatus 14 receives the biometric input, then compares the biometric input to a stored template to derive a correlation factor. If the correlation factor is below a prescribed threshold level, the correlation is unsuccessful. In some embodiments, the security apparatus may then display that the biometric entry is invalid. In other embodiments, the security apparatus need not notify the user that the biometric entry was invalid. Instead an invalid token is displayed, so that upon input to the access device 12 access to the host system 10 is denied and the host is informed of an access attempt.

In an embodiment of the invention using the challenge code, in addition to providing biometric input to the security apparatus, the user inputs a challenge code by, for example, handwriting, voice, or typing, which will usually be generated by the host system and displayed to the user. In another exemplary embodiment of the invention using the challenge code, the biometric information is obtained from the very operation of inputting the challenge code by the user. For example, as the user inputs the challenge code by voice, handwriting, or typing on a keypad, the security apparatus makes biometric measurements of the input to generate the necessary biometric information. This information is then compared to a stored template to derive a correlation factor, as described above.

For a successful biometric entry or where the user is not informed of a failed biometric entry, the correlation factor is combined with a fixed code (i.e., PIN, embedded serial number, account number) and in one embodiment, a time-varying code (i.e. the time of day) to generate the security token. In the challenge code embodiment, the correlation factor is combined with a fixed code and the challenge code to generate the security token. The token is displayed on a display panel of the security apparatus 14. The user then enters such token at the access device 12. The access device 12 sends the token to the host 10 which decodes the token to identify the embedded fixed code and correlation factor. In an alternative embodiment, the security apparatus 14 is coupled directly to the host system 10, such that the token output is transmitted directly to the host without the need for displaying the token or manual entry by the user. The coupling can be accomplished using, for example, standard data communication cable or any other known data transmission technique.

To properly decode the token, the security apparatus 14 is synchronized with the host system 10 so that the time varying code is identical at both the security mechanism 14 and the host system 10. In the challenge code embodiment, the host system, having generated the challenge code, retains the challenge code in memory to decode the token. The host 10 identifies the user with the fixed code and verifies the identification based on the correlation factor. The host system 10 permits full or limited entry based upon the level of authorization assigned to a given user (as identified by the fixed code). For example, a given user may be allowed to perform an electronic funds transfer only from a prescribed account.

Biometric Security Apparatus

FIG. 2 shows an electronic block diagram of the biometric security apparatus 14. The apparatus 14 includes a power source 15, on/off switch 16, biometric sensor 18, display 20, processor 22 with on-chip random access memory, biometric input section 33 for receiving biometric information from the biometric sensor a read only memory (ROM) 24 (which may be a PROM, EPROM or the like), time-varying code generator 26 and display drivers 30. Preferably, the processor 22, ROM 24, generator 26 and drivers 30 are formed as a multi-chip module 32, or a single ASIC.

In one embodiment the processor 22 is an 8-bit microprocessor with 156 bytes of random access memory available on-chip, such as a type 8051 microprocessor manufactured by Intel Corporation of Santa Clara, Calif. An amount of random access memory, e.g., 16 kbytes of RAM, may be located apart from the 8051 microprocessor off-chip. A nonvolatile memory element, e.g., ROM 24 is for example a 32 kbyte memory. Each security apparatus 14 comes with an embedded "fixed" code stored in PROM 24. Such fixed code is used to form a token and is thus available to the host system 10 to identify a person requesting access The display 20 is a 7–10 character LCD panel, although the number of characters may vary according to the embodiment. Conventional LCD driver circuits 30 are coupled between the processor 22 and LCD display 20. The time-varying code generator 26 may be a time-based generator available from Security Dynamics Technologies of Cambridge, Mass. and described in U.S. Pat. No. 4,720,860, the complete disclosure of which is hereby incorporated herein by reference. The generator 26 utilizes a real time clock 25 to generate a time-varying code for use in deriving a token. The time-varying code is based on the time of day. The U.S. Pat. No. 4,720,860 describes a method for keeping the time of day the same as in a host system without interconnection between the generator 26 and host system such that biometric security apparatus 14 and host system 10 can generate the same token for a given input at a given time. Processor 22 generates a security token based on the time-varying code, fixed code and biometric input from biometric sensor 18, and outputs the token to display 20.

Alternatively, processor 20 may include a standard encryption module which applies an encryption algorithm to the time of day from real time clock 25, the fixed code and a biometric correlation factor, generating an encrypted security token. Such an encryption module is described in U.S. Pat. No. 4,819,267 and U.S. Pat. No. 4,405,829, the complete disclosures of both patents hereby being incorporated herein by reference. The security token is output to display 20. In this embodiment, the host system 10 includes a decryption module, capable of decrypting the encrypted code generated by the encryption module of biometric security apparatus 14. The capability to decrypt the token at the host system allows the token input by the user to be broken down into its biometric, time-varying and fixed code components. In some applications, this has distinct advantages over systems which are capable only of comparing the input token to a stored or time-generated value.

FIG. 3 shows an integrated circuit card 14' embodiment of the security apparatus 14. The card 14' serves as a convenient accessible security device kept in the possession of a person seeking access to the host system 10. The card may be the length, width and thickness of a conventional credit card.

Biometric Sensor Embodiments

The biometric sensor 18 detects biometric input from a user (i.e., card-holder, pen-holder), the exact nature of which is not critical to the invention, so long as it senses information which is basically personal and substantially invariant in characteristics which are detected. According to various embodiments, the sensor 18 may detect a fingerprint, a signature, a voice or other like information. For the card embodiment 14', the sensor 18 may be a scanning device which detects a fingerprint or pressure sensing device which detects a signature. Alternatively, a CCD imaging device could be used to capture a picture of the fingerprint or signature. The sensor 18 also could be a voice detector.

Enroll Mode

The security apparatus 14 initially is configured in an "enroll" mode. During the enroll mode, one or more, preferably several, biometric samples are obtained and permanently stored as templates. In alternate embodiments, multiple templates for multiple users are stored. During normal operations, a biometric input sample is compared to one or more of the templates to identify whether the person entering the sample is a person whose templates are stored.

To permanently store the templates and prevent reentry into enroll mode, the enroll software is normally inaccessible after the first use. For multi-user embodiments, the enroll mode can be re-entered or reset only by an authorized user after valid biometric input is entered. If such input has the priority level authorizing re-entry or resetting to the enroll mode, then the enroll mode is entered.

Normal Mode

Once enrollment is complete, the security apparatus 14 permanently enters normal mode. In normal mode a user turns on the apparatus 14 using switch 16, then enters biometric input based on the type of biometric sensor 18 installed. The biometric input is received from the biometric sensor 18 into input section 33. Regardless of whether a fingerprint, signature or voice entry, the biometric input is compared to one or more stored templates. A correlation factor is calculated for each template. If the correlation factor indicates correlation closer than a prescribed threshold level (i.e., 90 on a scale of 0 to 100) for any template, then the biometric verification is successful. If none of the correlation factors satisfy the prescribed level, then the biometric verification is unsuccessful. In one embodiment, a message is displayed to indicate an invalid biometric input. In another embodiment, where it may be undesirable to notify the holder that the entry is invalid, an invalid token is displayed, which when entered at the access device 12 does not enable access to the host system 10, but which allows the host system to record the unsuccessful attempt.

Each security apparatus includes a unique embedded code (e.g., fixed code) as previously described. The correlation factor, fixed code and a time-varying code from the time code generator 26 together are used to derive a security token.

The derived token is then displayed. The user then reads the token from the display 20 and enters the token at the access device 12. The access device 12 transmits the token to the host 10 which decrypts or decodes the token to derive the fixed code and correlation factor. If the fixed code identifies a valid user and the correlation factor is above the threshold level, then access is permitted. If not, then access is denied. With a fixed code to identify a particular person or group of persons, the host can be programmed to control the type of access or transactions allowed for such fixed code.

The method and apparatus of the present invention have significant advantages over known security systems. Reliable and secure identification is provided which eliminates the need for the user to memorize a code or carry a printed memorandum of the code. Transmission security is provided which is convenient, secure and useful on existing access devices of host systems in current use. In particular, the method and apparatus obviate the need for specially-designed hardware additions or modifications to existing access devices. The security token generated by the present invention may be input in the same manner as PINs or other security codes in common use. The security token could even be input from a telephone or computer at a remote location via electronic transmission to an access device.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A user verification apparatus for use in verifying the identify of a user of a remote host system as that of an authorized user, comprising:
   (a) means for receiving biometric information from the user;
   (b) memory means for storing acceptance threshold level data along with previously obtained biometric information of the authorized user and a fixed code;
   (c) comparison means for comparing said biometric information from the user with said previously obtained biometric information and for generating a correlation factor;
   (d) signal generating means for comparing said correlation factor with said acceptance threshold level data to generate a transmittable code, including an authentication code; and
   (e) transmission means for receiving said transmittable code from said signal generating means and for transmitting said transmittable code, including said authentication code, to the host system for a determination by the host system of whether to grant to the user access to the host system.

2. An apparatus as defined in claim 1 in which said signal generating means is further adapted to combine said first authentication code and said fixed code to generate a transmittable code adapted to be transmitted to said transmission means for subsequent transmission to the host system for a determination by the host system of whether to grant to the user access to the host system.

3. An apparatus as defined in claim 2 further including means for inputting a time varying code into said memory means and in which said signal generating means is adapted to combine said first authentication code with said time varying code to generate a transmittable code adapted to be transmitted to said transmission means for subsequent transmission to the host system for a determination by the host system of whether to grant to the user access to the host system.

4. An apparatus as defined in claim 2 further including means for inputting a challenge code to said signal generating means and in which said signal generating means is adapted to combine said authentication code and said challenge code to generate a transmittable code and in which said transmission means is adapted to transmit said transmittable code to the host system for a determination by the host system of whether to grant the user access to the host system.

5. An apparatus as defined in claim 4 in which said transmittable code is numerical.

6. An apparatus for use in verifying the identity of a user of a host system as that of the authorized user, comprising:
   (a) input means for receiving biometric input from the user and for generating an input signal in response thereof;
   (b) memory means for storing biometric information of the authorized user and for storing acceptance level data;
   (c) data processing means communicating with said input means and said memory means for:
      (i) receiving said input signal from said input means;
      (ii) receiving said biometric information of the authorized user from said memory means;
      (iii) comparing said input signal and said biometric information of the authorized user, and
      (iv) generating a similarity signal.
   (d) signal generating means for comparing said threshold acceptance level data with said similarity signal to generate a transmittable code including an authentication code; and
   (e) transmission means for receiving said transmittable code from said signal generating means and for transmitting said transmittable code, including said authentication code to the host system for a determination by the host system whether to grant to the user access to the host system.

7. An apparatus as defined in claim 6 further including means for generating a time code signal and for inputting said time code signal into said memory means, said signal generating means being adapted to combine said time code signal and said authentication code to generate a transmittable code for transmission to said transmission means.

8. A method for authenticating a user's identity as being that of an authorized user and securing access to a host system, comprising the steps of:
   (a) receiving a user's biometric input;
   (b) comparing the biometric input with a stored template to generate a correlation factor;
   (c) comparing said correlation factor with predetermined acceptance threshold level data to generate a transmittable code;
   (d) transmitting said transmittable code to the host system; and
   (e) determining at the host system from the received transmittable code whether to grant access to the host system.

9. A method as defined in claim 8 in which said correlation factor is combined with said acceptance threshold level data to generate an authentication code which is then combined with a time varying code to generate a transmittable code for transmitting to the host system for use in determining whether to grant access.

10. A method as defined in claim 9 in which said transmittable code thus generated is further combined with a challenge code to generate a numerical code for transmitting to the host system to determine at the host system whether access is authorized.

* * * * *